United States Patent
Baudoin et al.

(10) Patent No.: US 11,863,290 B2
(45) Date of Patent: Jan. 2, 2024

(54) PROCEDURE FOR ENTRY INTO A SATCOM NETWORK EMPLOYING BEAM HOPPING

(71) Applicant: THALES, Courbevoie (FR)

(72) Inventors: Cédric Baudoin, Toulouse (FR);
Jean-Christophe Levy, Toulouse (FR);
Bernard Coulomb, Toulouse (FR);
Thierry Quignon, Toulouse (FR);
Katia Leconte, Toulouse (FR);
Mathieu Gineste, Toulouse (FR);
Xavier Wautelet, Toulouse (FR)

(73) Assignee: THALES, Courbevoie (FR)

( * ) Notice: Subject to any disclaimer, the term of this patent is extended or adjusted under 35 U.S.C. 154(b) by 178 days.

(21) Appl. No.: 17/392,832

(22) Filed: Aug. 3, 2021

(65) Prior Publication Data
US 2022/0123827 A1    Apr. 21, 2022

(30) Foreign Application Priority Data

Aug. 6, 2020 (FR) ..................................... 2008318

(51) Int. Cl.
*H04B 7/185* (2006.01)

(52) U.S. Cl.
CPC ................ *H04B 7/18513* (2013.01)

(58) Field of Classification Search
CPC ............ H04B 7/18513; H04B 7/18539; H04B 7/1851; H04B 7/18545; H04W 16/28; H04W 84/06
See application file for complete search history.

(56) References Cited

U.S. PATENT DOCUMENTS

| 6,625,129 | B1 * | 9/2003 | Olds ................... | H04B 7/2041 |
| | | | | 370/320 |
| 2014/0354476 | A1 * | 12/2014 | Sagiraju ................ | G01S 19/28 |
| | | | | 342/357.67 |
| 2019/0280765 | A1 * | 9/2019 | Miller ................... | H04B 7/212 |

FOREIGN PATENT DOCUMENTS

| EP | 3 579 458 A1 | 12/2019 |
| WO | 01/26251 A2 | 4/2001 |
| WO | 01/26251 A3 | 4/2001 |

\* cited by examiner

*Primary Examiner* — Fred A Casca
(74) *Attorney, Agent, or Firm* — BakerHostetler

(57) ABSTRACT

A method for entry into a satellite communication network includes at least one satellite, the communications of the satellite communication network being organized according to a beam-hopping mechanism wherein hop frames define antenna beam configurations of the at least one satellite, wherein resources of the hop frames are reserved for forming directional entry beams dedicated to entry or re-entry of user terminals into the satellite communication network, at least two of the directional entry beams having different directions of sight. A satellite, a user terminal and a communication network configured to implement the described method.

14 Claims, 6 Drawing Sheets

PROCEDURE FOR ENTRY INTO A SATCOM NETWORK EMPLOYING BEAM HOPPING

CROSS-REFERENCE TO RELATED APPLICATIONS

This application claims priority to foreign French patent application No. FR 2008318, filed on Aug. 6, 2020, the disclosure of which is incorporated by reference in its entirety.

FIELD OF THE INVENTION

The present invention relates to the field of satcom transmissions, and more particularly relates to a method for entry into a satellite communication network for a user terminal when the communications of the satcom network are organized by a beam-hopping mechanism. The invention is applicable to geostationary satellites and to non-geostationary satellites.

BACKGROUND

Entry into a satcom network is a major function of satellite communication systems. Both the first entry of a user terminal (or satcom terminal) into a satellite communication network, and re-entry into the network in case of loss of connection for a long time, are concerned. Its performance (time taken to enter or re-enter into the system) contributes to the overall performance of the network.

The procedure for entry of a satcom user terminal into a satcom network is a procedure well known to those skilled in the art. It generally comprises two phases:
- a first phase in which the user terminal synchronises in time and in frequency with the satellite and gathers signalling data comprising information on the structure of the uplink frame, in order to be able to send a connection request (logon) at times provided for this purpose, and
- a second phase in which the user terminal receives, from the mission segment, a connection response with connection information, and registers with the network.

Knowing about the existence and needs of the user terminal, the communication network is then able to attribute resources thereto for the transmissions thereof. Below, the maximum area of the earth that a satellite irradiates will be called its area of coverage. The size of the area of coverage depends on the altitude of the satellite and on characteristics of its one or more antennas.

In the case of a communication network based on one or more multi-spot geostationary satellites offering continuous coverage of their area of coverage, entry into the network is simple since the position of the satellite is known and a user terminal has radio connectivity with the satellite whatever its position in the area of coverage. The user terminal may then start a standard procedure for entry into the network, comprising a synchronisation with the satellite and a registration, on the basis of the signalling data transmitted with the data traffic.

In the case of a non-geostationary satellite that irradiates all of its area of coverage, as for example in the case of a satellite in a constellation of LEO or MEO satellites (LEO and MEO being the acronyms of low Earth orbit and medium Earth orbit, respectively), the position of the satellite is unknown, or known through information, such as ephemerides, the precision of which is insufficient to point the antenna of the user terminal directly toward the satellite. In this case, systems, such as the Iridium satcom system, are known in which the user terminals have antennas that are not very directional. This low directionality decreases the link budget and therefore the performance of the transmissions. Furthermore, the emissions of the user terminals may then partially be oriented in the direction of the geostationary arc, this being forbidden for transmissions intended for LEO or MEO satellites in certain bands by regulatory constraints.

Alternatively, for user terminals using directional antennas, it is known to carry out a step of searching for and tracking the position of the satellite before entry into the network. The search for the satellite is carried out both in elevation and in azimuth, and, depending on the case, also in frequency and/or in polarisation. This search complexifies and slows the entry of the user terminal into the network.

Entry of a user terminal into the satcom network is no longer possible if the satellite offers only a partial coverage in its area of coverage, and if the user terminal is located in an uncovered area. This particular case arises in the case of satellites the transmissions of which use beam hopping, which consists in irradiating geographic spots depending on the needs of users. Certain spots not being used by active users may then be turned off; user terminals present in a turned-off area have no radio link with the satellite allowing them to carry out the procedure for entry into the network.

One known solution to this problem consists in using a particular frequency band for entry into the network, an antenna beam covering all the area of coverage of the satellite being used for these transmissions. The frequency band may be chosen so as to avoid problems of emission in the direction of the geostationary arc. However, this solution requires additional equipment to be inserted into the satellite and the bands used to be available everywhere in the area of coverage (problem of frequency regulation). Furthermore, the use of a large antenna beam decreases the gain of the radio link. Another solution to this problem consists in defining time intervals reserved for entry into the satcom network, during which time intervals the satellite uses an antenna beam covering the entirety of its area of coverage. This solution is also unsatisfactory because a significant portion of the useful bandwidth is then used for entry into the network in the entirety of the area of coverage of the satellite and cannot therefore be used to transmit data traffic, and because the transmission with a large antenna beam from the satellite decreases the gain of the radio links.

SUMMARY OF THE INVENTION

One aim of the invention is therefore to provide a method allowing a procedure for entry into the network to be implemented in the case of geostationary or non-geostationary satellites able to offer only a partial coverage of their area of coverage because they use beam hopping.

Another aim of the invention is for the described method to allow a terminal to enter into the network in a small amount of time and for this entry to have a small impact on the capacity of the network.

Lastly, another aim of the invention is for, in the case of a non-geostationary satellite, the method to allow the position of the satellite to be rapidly acquired, and to not involve emissions in the direction of the geostationary arc.

To this end, the present invention describes a method for entry into a satellite communication network comprising at least one satellite, in which the communications are organized according to a beam-hopping mechanism in which hop frames define antenna beam configurations of the at least one satellite. In the method according to the invention, resources of the hop frames are reserved for forming directional entry beams dedicated to entry or re-entry of user terminals into the satellite communication network, at least two of the directional entry beams having different directions of sight.

According to one embodiment, the directional entry beams are used for the transmission, by the satellite, of information on the modalities of transmission of requests for entry or re-entry into the satellite communication network by user terminals, and for the transmission, by one or more user terminals, of requests for entry or re-entry into the satellite communication network.

Advantageously, the amount and arrangement of the hop-frame resources reserved for forming directional entry beams is dynamically adaptable.

In one embodiment, the directional entry beams are configured so that the beams of the hop frames offer a radio link to all of the area of coverage of the satellite.

In one embodiment, the at least one satellite is a non-geostationary satellite. In this case, the directional entry beams are configured so as to be able to be seen from the Earth with a substantially constant elevation.

Advantageously, the elevation with which the directional entry beams may be seen from the Earth is comprised between 10° and 30°, preferably between 15° and 25°, and more preferably is substantially equal to 20°.

Advantageously, the directional entry beams are configured so that a plurality of directional antenna beams covers an angular aperture substantially smaller than 180°.

Advantageously, the directional entry beams are oriented so that the emissions of user terminals entering or re-entering into the satellite communication network are not transmitted in the direction of the geostationary arc.

Advantageously, a user terminal seeking to enter into the satellite communication network is configured to search for the non-geostationary satellite by directing its antenna beam to an elevation corresponding to the elevation of the entry beam, and by carrying out a search for the satellite in azimuth alone. Advantageously, the user terminal uses information regarding the position of the satellite to decrease its in-azimuth search space.

The invention also relates to a satellite in a satellite communication network the communications of which are organized according to a beam-hopping mechanism in which hop frames define antenna beam configurations of the satellite. In the satellite according to the invention, resources of the hop frames are reserved for forming directional entry beams dedicated to entry or re-entry of user terminals into the satellite communication network, at least two of the directional entry beams having different directions of sight.

The invention also relates to a user terminal configured to enter or re-enter into a satellite communication network comprising at least one non-geostationary satellite, the communications of the satellite communication network being organized according to a beam-hopping mechanism in which hop frames define antenna beam configurations of the at least one non-geostationary satellite, resources of the hop frame being reserved for forming directional entry beams dedicated to entry or re-entry of user terminals into the satellite communication network, at least two of the directional entry beams having different directions of sight, the directional entry beams being configured so as to be able to be seen from the Earth with a substantially constant elevation. According to the invention, the user terminal is configured to enter or re-enter into the satellite communication network by:

orienting the elevation of its antenna beam to the elevation of the directional entry beam and by searching for the position of the satellite in azimuth alone, sending a request for entry or re-entry into the satellite communication network.

Lastly, the invention relates to a satellite communication network comprising at least one satellite such as described above, and at least one user terminal.

BRIEF DESCRIPTION OF THE DRAWINGS

The invention will be better understood and other features, details and advantages will become more clearly apparent on reading the following non-limiting description, and by virtue of the appended figures, which are given by way of example.

DETAILED DESCRIPTION

The invention describes a method for entry of a user terminal into a satcom network comprising at least one, geostationary or non-geostationary, satellite using beam hopping.

Beam hopping is a mechanism that is very commonly used in satellite communications. It allows complete and instantaneous reconfigurability of the satellite coverage via the definition of frames, called hop frames, divided into time intervals. Each time interval is associated with one or more antenna-beam configurations. The beams are formed using an active antenna, generally allowing a plurality of directional beams to be formed in parallel with a view to irradiating a plurality of spots simultaneously, or a plurality of directional antennas, using one or more frequencies and one or more polarisations. The hop frames are defined dynamically as required in order to serve all the actors of the network as best as possible. They may be represented in the form of a two-input table associating a formed-antenna-beam configuration and an antenna port of the satellite with each time interval.

The method according to the invention consists in dedicating certain resources of the hop frames to the entry into the network of user terminals, by forming in these dedicated resources, from the satellite, a directional antenna beam. By directional antenna beam what is meant is the fact that the beam covers only one portion of the area of coverage of the satellite, this allowing the gain of the link between the satellite and the user terminals to be increased. The entry beams are transmission and/or reception beams depending on whether the communications between the satellite and the user terminals occur on the uplink or on the downlink. They are not used for the transmissions of data traffic (useful data) between the user terminals and the satellite, but for the transmission of signalling information allowing the entry/re-entry of user terminals into the network. This information may be, on the downlink, information regarding the position of the satellites (ephemerides for example), and information allowing the user terminals to transmit a connection request (for example information regarding a broadcast channel).

Figure 1:
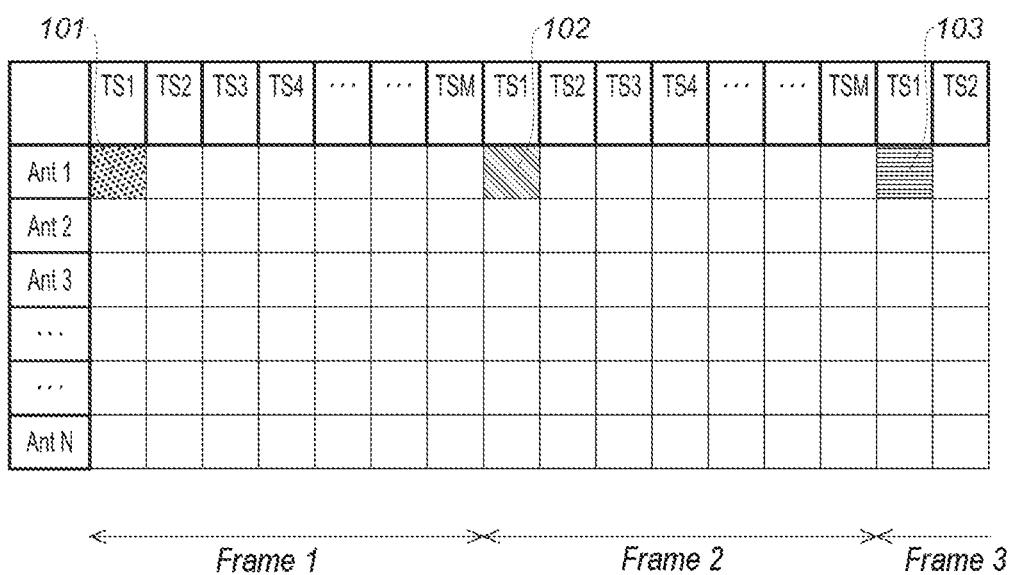
FIG. 1 illustrates a succession of beam-hop frames in a method for entry into a satcom network according to one embodiment of the invention.

FIG. 1 illustrates a succession of beam-hop frames in a method for entry into a satcom network according to one embodiment of the invention. Hop frames, which are divided into a plurality of time intervals TS1, TS2, . . . , TSM, are formed. The columns of FIG. 1 are the various antenna ports Ant 1, Ant 2, . . . , Ant N of the satellite. The number of time intervals per hop frame and the number of antenna ports are here given merely by way of illustration. In the hop frame, for each time interval, one antenna beam configuration is associated with each port.

The invention consists in reserving, inside the hop frames, beams 101, 102 and 103 for forming a directional beam allowing the entry of terminals into the satcom network, which beams are called entry beams. The rest of the hop frames are unaffected by the method according to the invention. In the example of FIG. 1, an entry beam is reserved in the first time interval of each hop frame on the first antenna port. However, the frequency of the beams dedicated to the entry into the network may be increased so as to accelerate entry into the network, or decreased so as to consume fewer resources. The beams dedicated to entry into the network are not necessarily regularly distributed or on the same antenna port: their distribution is free and depends only on the sought-after performance. They may also be ad hoc beams formed when resources of the satellite are available. The distribution of the entry beams in the hop frames therefore results from a compromise between time of entry into the network for the user terminals and impact on the capacity of the network.

By way of example, with a hop frame of 16 ms divided into 16 time intervals of 1 ms in a satellite comprising 24 antenna ports, reserving one entry beam per frame leads to a very small decrease in the total capacity of the system, of about 0.26%.

Advantageously, the entry beams may all use the same carrier frequency (or a limited number of carrier frequencies) and/or the same polarisation, so as to simplify the step in which the user terminal searches for the satellite.

The entry beam formed by the satellite is a directional beam directed toward one particular geographical area of the area of coverage of the satellite, so as to intermittently offer a radio link to the terminals of areas not covered by the satellite. The size of this area is dependent on the gain sought for the transmission, on the amount of resources dedicated to the entry into the network, on the relative speed of the satellite and on the performance sought as regards the time of entry into the network. In order to increase antenna gain, the entry beams have different directions of sight.

With respect to known systems in which time intervals of the hop frames are used for the entry of terminals into the network, and during which the satellite uses a non-directional antenna in order to cover the entirety of its area of coverage, the method according to the invention uses directional antenna beans that may be formed in parallel with other directional beams covering other portions of the area of coverage, as shown in FIG. 1. The implementation of the method according to the invention therefore leads to a much smaller decrease in the capacity of the system than known methods. It furthermore has the advantage of being able to define the entry beams in the same frequency bands as beams dedicated to traffic, thus solving problems with allocation of frequency bands and with additional hardware required in the satellite and the user terminals.

In a first embodiment, the entry beams are defined so as to irradiate in turn each of the satcom spots of the area of coverage of the satellite. In this way, each spot of the area of coverage of the satellite is covered periodically. A user terminal located in a spot that is not covered will then necessarily have periods of radio link with the satellite, which are used to carry out a standard procedure for entry into the network.

In another embodiment, the entry beams are defined so as to irradiate, one after the other, geographical regions not served by the traffic beams of the hop frame. In this case, the user terminals located in areas covered by the satellite achieve their entry into the network on the basis of signalling data exchanged in the traffic beams, whereas user terminals located outside of the areas covered by the traffic beams of the satellite have access to a radio link when the entry beam is directed toward them.

In these two embodiments, the traffic beams and the entry beams allow, intermittently, all of the area of coverage of the satellite to be covered, and therefore allow entry into the network of any user located in its area of coverage, even when said user is not covered by the traffic beams.

In another embodiment, specific to the case of non-geostationary satellites, the entry beam is an antenna beam of constant elevation, i.e. a beam that, seen from the ground, forms a strip in which a user terminal has a radio link with the satellite when it points its antenna with an elevation corresponding to the chosen elevation. Because of the shape of the radiation pattern of the antenna of the satellite, the notion of constant elevation is to be taken with a margin, and slight variations around the set elevation are possible.

Figure 2A:
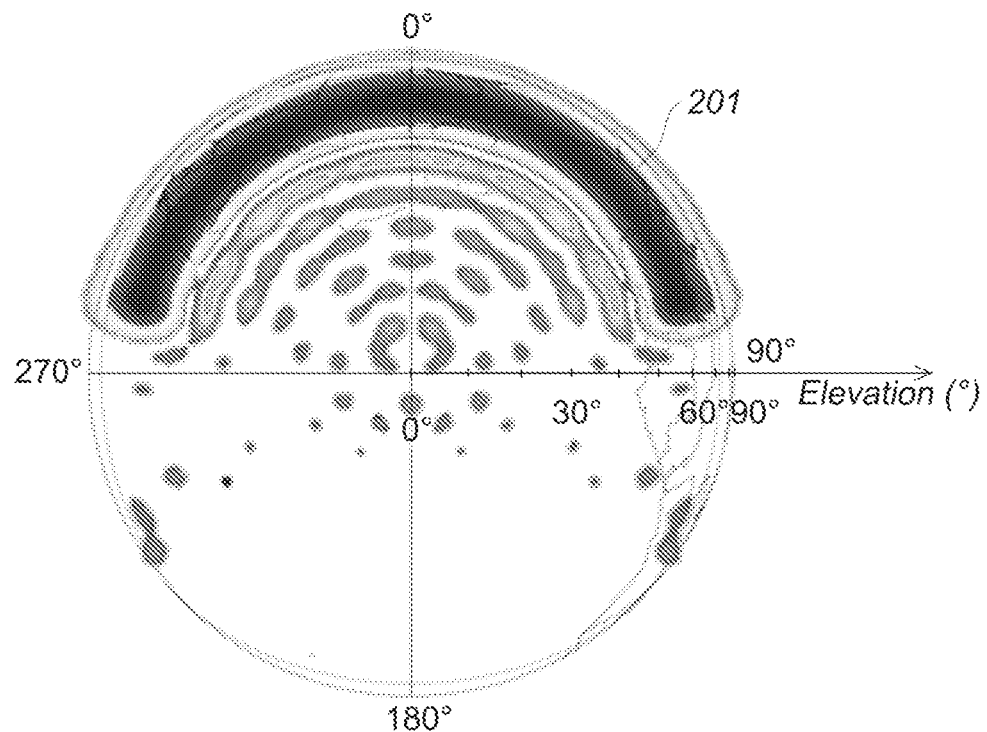
FIG. 2a illustrates the overall radiation pattern of a satellite antenna in one embodiment of the invention, in the case of a non-geostationary satellite.

FIG. 2a illustrates the overall radiation pattern of a satellite antenna in one embodiment of the invention, in the case of a non-geostationary satellite. The representation is given in the frame of reference of the satellite: it represents the area of coverage of the satellite, and gives the equivalent radiated isotropic power level as a function of the direction of the beam and of the elevation in this area of coverage. The darkest areas correspond to the areas of highest power. In FIG. 2a, the satellite has an antenna beam 201 the power of which is concentrated about a constant elevation of about 20° in the frame of reference of the satellite, for an angular aperture in azimuth equal to about 150° oriented northwards.

The use of an antenna beam with a constant elevation has a plurality of advantages:
  associated with the movements of all of the satellites of the constellation, it allows systematically and regularly almost all of their areas of coverage to be covered, and therefore offers an opportunity of entry into the network to user terminals not covered by the traffic beams;
  it allows a satcom terminal to determine the position of the satellite by scanning space on the axis of the azimuths only, this removing a constraint on the beam formation of the satcom terminal and/or its mechanical movement, and decreasing the time taken to find the satellite, and therefore the time of entry into the network. Furthermore, the user terminal may use a very directional antenna beam since the elevation of the satellite is known, this improving link budget;

The antenna beam of the satellite is directional, this increasing the gain of the radio link between the satellite and the visible user terminals;

The antenna beam of the satellite may be oriented so as to prevent user terminals emitting in the direction of the geostationary arc.

So as to improve the link budget of the network entry beans, the invention proposes to divide the entry beam into a plurality of beams having different azimuthal directions of sight, and together covering all of the angular aperture of the beam 201.

Figure 2B:
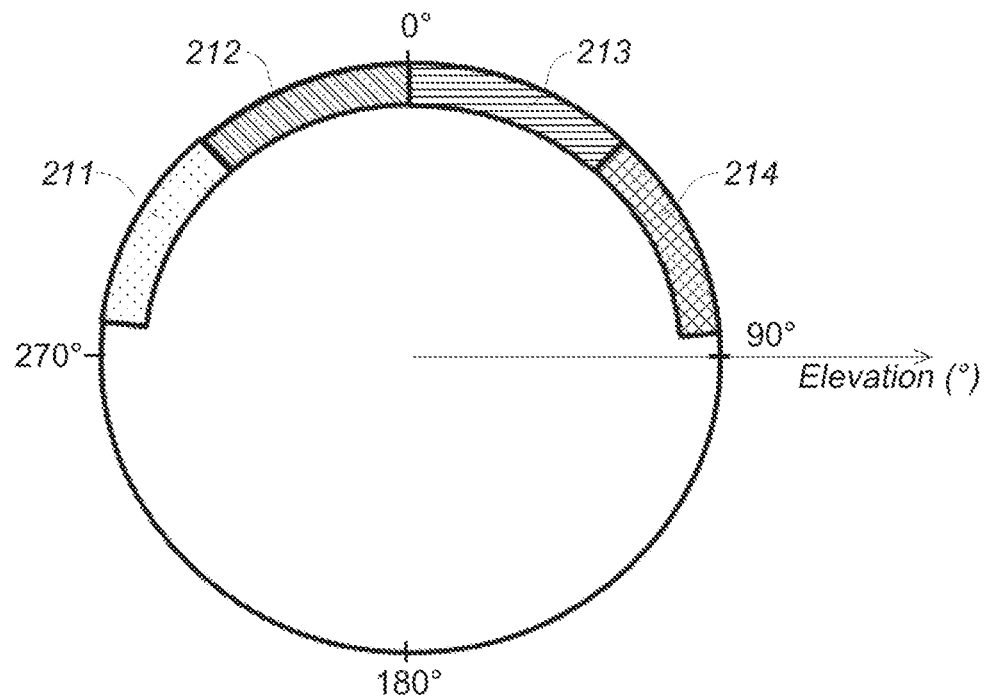
FIG. 2b schematically shows the radiation pattern of a satellite antenna in one embodiment of the invention, in the case of a non-geostationary satellite.

FIG. 2b schematically shows such an embodiment, in which the entry beam of constant elevation is divided into a plurality of separate sub-beams. In the example, the entry beam is divided into four sub-beams 211, 212, 213 and 214 having the same elevation but different directions of sight, so as to cover all of an angular aperture similar to that of FIG. 2a.

This embodiment allows the angular aperture in azimuth of the entry beams to be limited, and therefore link budget to be improved. In the example of FIG. 2b, the division of the entry beam into four sub-beams allows an increase in link budget of about 6 dB. The number of sub-beams may be set in light of the desired increase in the link budget and the desired impact on the overall capacity of the system.

Figure 2C:
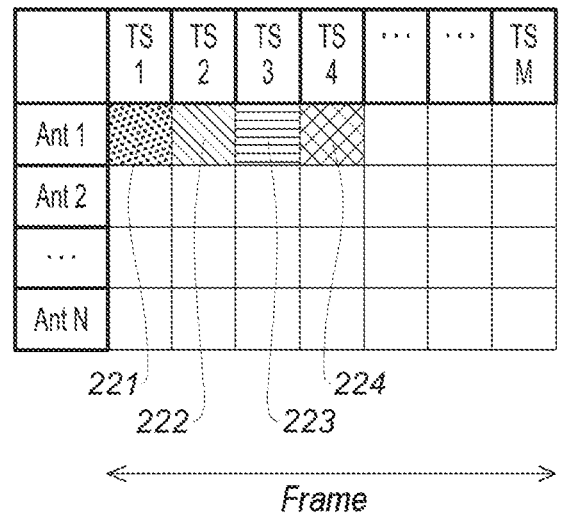
FIG. 2c shows the allocation of resources in a hop frame for entry into the network in one embodiment of the method according to the invention.
Figure 2D:
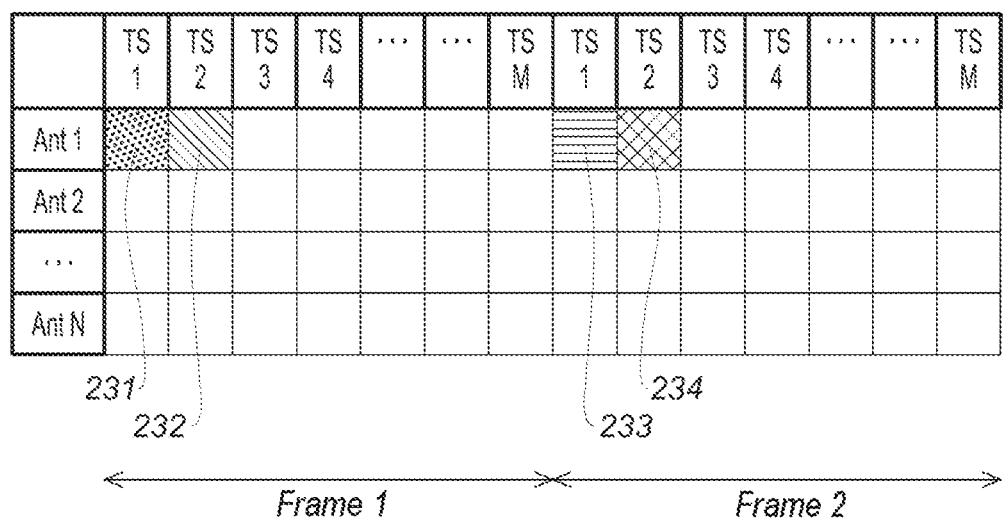
FIG. 2d shows the allocation of resources in hop frames for entry into the network in one embodiment of the method according to the invention.

FIGS. 2c and 2d show various embodiments of the allocation of resources in one or more hop frames in some embodiments of the method according to the invention. In FIG. 2c, the sub-beams 211 to 214 are formed within each frame. To do this, the resources 221 to 224 are respectively attributed thereto within each frame. Compared to the embodiment of FIG. 1, the impact of the allocation of entry beams on the overall capacity of the network is then multiplied by 4, but the decrease in capacity remains smaller than in prior-art methods. It will be noted that the arrangement of the resources allocated within the hop frame is unimportant: they may be identically attributed in a given time interval to separate antenna ports, or any other configuration may be used.

In FIG. 2d, the resources 231 to 234 respectively attributed to the formation of the entry beams 211 to 214 are allocated in various hop frames. In FIG. 2d the four sub-beams are distributed in two successive frames. Compared to the embodiment of FIG. 2c, the impact on the capacity of the network is decreased, but the time for which the satellite is observable by a user terminal is divided by two.

The frame definitions given in FIGS. 2c and 2d are given merely by way of illustration, and a person skilled in the art will be easily able to modify these definitions depending on his operational requirements, and in particular on the gain expected in the entry beam, on the duration of visibility of the satellite and on the desired impact on the overall capacity of the network. Furthermore, the distribution of the resources attributed to the formation of entry beams may be adapted dynamically, for example in order to form more beams in areas in which the conditions of propagation are unfavourable (for example around the equator, or when meteorological conditions are unfavourable) in order to improve link budgets. For example, eight entry beams could be defined (four allocations per frame spread over two successive frames) for transmissions in proximity to the equator, and only four (two allocations per frame spread over two successive frames) above 50° of latitude.

Figure 3:
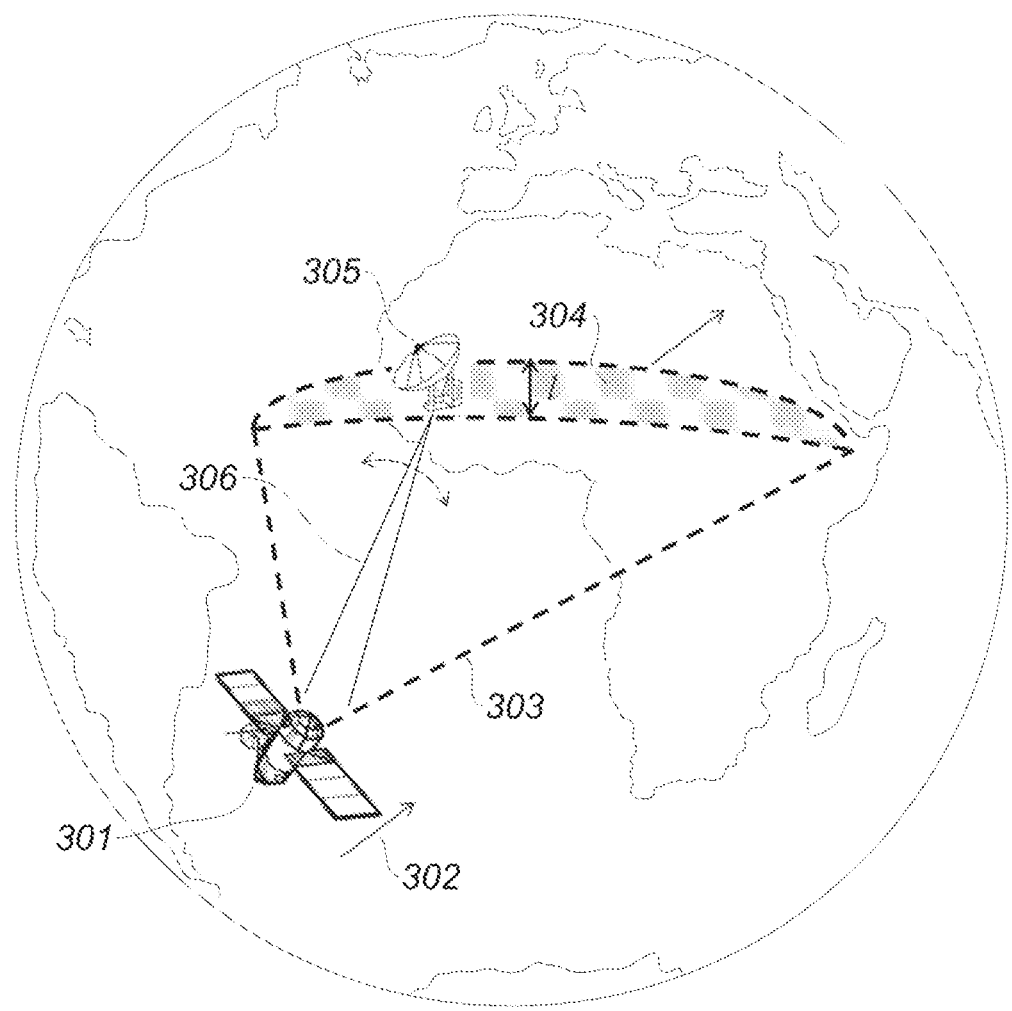
FIG. 3 illustrates the implementation of the method for entry of a user terminal into a satcom network according to one embodiment of the invention.

FIG. 3 illustrates the implementation of the method for entry of a user terminal into a satcom network according to one embodiment of the invention, in the case of a non-geostationary satellite. The non-geostationary satellite 301, for example an LEO satellite moving in an inclined orbit in the direction 302, is configured to form an antenna beam 303 of constant elevation the footprint of which on the ground has been shown by a strip 304 that is curved because of the curvature of the Earth. The footprint on the ground 304 corresponds to the sum of the entry sub-beams formed so as to cover a large azimuth while benefiting from a high antenna gain, as shown in FIG. 2b. The strip 304 has a width l that depends on the altitude of the satellite and on the aperture of the antenna beam. The area 304 moves at the same time as the satellite 301. A user terminal 305 seeking to enter into the satcom network and the antenna of which is positioned at the correct elevation is therefore in radio visibility with the satellite 301 during a time that depends on the speed of the satellite, on its altitude, on the configuration of the entry beam, on the angle of elevation chosen and on the number of entry sub-beams formed. For example, for a non-geostationary LEO satellite forming an entry beam of 4° aperture along the north-south axis about an elevation of about 20° for a user terminal, the footprint on the ground 304 has a width l larger than 300 km. If the satellite is moving in a polar orbit with a speed of 7.4 km/s, a user terminal pointing with an elevation of 20° will be visible to the satellite for about 40 seconds. The user terminal may use this time to detect the satellite by scanning the sky in azimuth only, with a view to subsequently carrying out the procedure for entry into the network (synchronisation and registration).

Figure 4A:
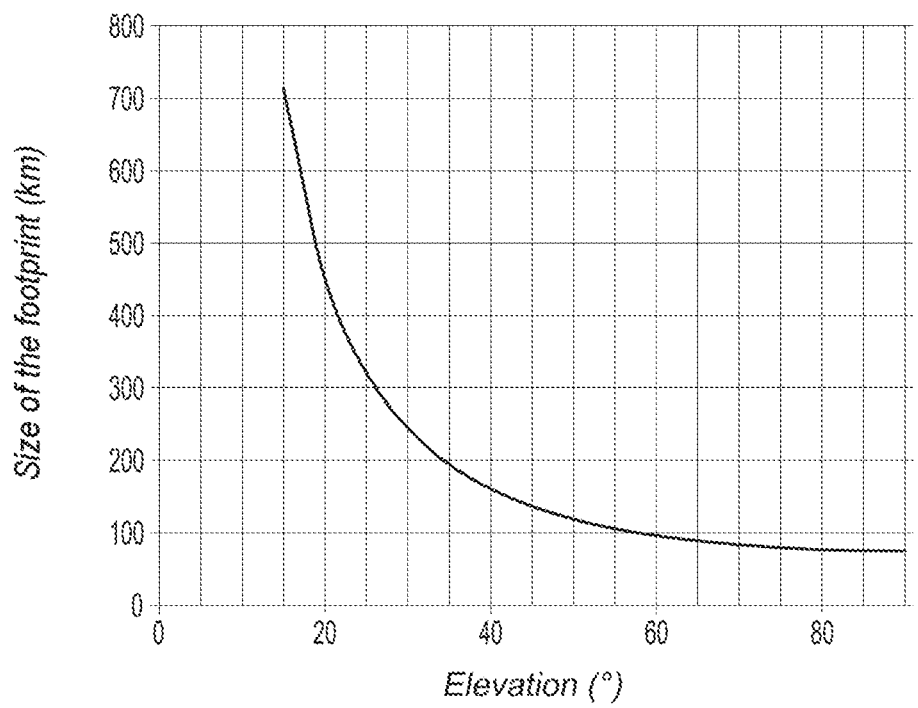
FIG. 4a shows the duration of irradiation for an LEO satellite in polar orbit as a function of the elevation of the satcom beam.
Figure 4B:
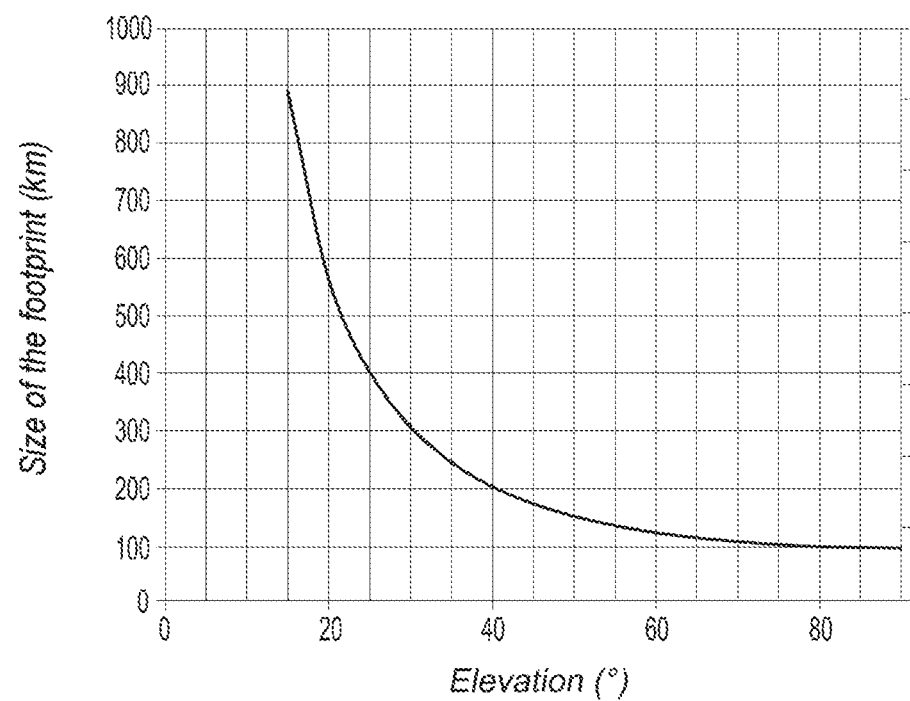
FIG. 4b shows the duration of irradiation for an LEO satellite in inclined orbit as a function of the elevation of the satcom beam.

The elevation and aperture of the entry beam are chosen depending on the movement of the satellite so as to increase the time of visibility by a user terminal and to maximise antenna gain. FIGS. 4a and 4b show the duration for which a user terminal is visible to a non-geostationary LEO satellite moving at 7.4 km/s with an antenna beam of aperture of 4° along the north-south axis, as a function of the choice made regarding the elevation of the entry beam. FIG. 4a assumes a satellite moving in a polar orbit at about 1000 km of altitude, whereas FIG. 4b assumes a satellite moving in an inclined orbit at about 1200 km of altitude. In the given case of application, the width l of the beam 304 is always larger than 300 km when the comprised elevation is chosen between 15° and 25°.

Ideally, the antenna beam of constant elevation transmitted by a non-geostationary satellite has an angular aperture of a few degrees along the small axis of its footprint on the ground, typically a −3 dB angular aperture smaller than 10°, typically of the order of 4 to 5°, and covers 360° in azimuth, so as to offer a radio link to the highest possible number of user terminals. However, regulatory considerations forbid user terminals from emitting in the direction of the geostationary arc in certain frequency bands. For this reason, the sub-beams dedicated to the entry into the network are advantageously chosen so as to have together an azimuthal aperture angle slightly smaller than 180° and directed toward a pole. This is the case for example in FIG. 2b, in which the entry beam corresponding to the four sub-beams 211 to 214 has an aperture in azimuth of about 150°. This configuration makes it possible to avoid user terminals emitting in the direction of the geostationary arc in one portion of the globe.

By varying the orientation of the equivalent entry beam formed by the various entry sub-beams during the progression of the non-geostationary satellite, the emissions of the user terminals during the procedure for entry into the network are systematically carried out in the direction opposite to the geostationary arc. For example, for a satellite in a polar orbit, the beam of constant elevation may be modified as follows:

when the satellite is moving from the equator in the direction of the North Pole, the various entry sub-beams form an equivalent entry beam oriented towards the South Pole, i.e. behind the satellite;

when the satellite is moving from the North Pole in the direction of the equator, the various entry sub-beams form an equivalent entry beam oriented towards the South Pole, i.e. in front of the satellite;

when the satellite is moving from the equator in the direction of the South Pole, the various entry sub-beams form an equivalent entry beam oriented towards the North Pole, i.e. behind the satellite;

when the satellite is moving from the South Pole in the direction of the equator, the various entry sub-beams form an equivalent entry beam oriented towards the North Pole, i.e. in front of the satellite.

Irrespective of whether it is in a polar orbit or an inclined orbit, orienting the equivalent entry beam in the direction of the poles, by switching at least four times during the period of rotation, allows emissions of the satcom terminals in the direction of the geostationary arc to be avoided.

In the vicinity of the poles, when the region of exclusion corresponding to the geostationary arc is not visible to the satcom terminals, the satellite may orient the equivalent directional entry beam both toward the front and toward the rear of the satellite, or modify the orientation of the beam by inclining it so as to achieve a larger visible covered area on the ground.

Figure 5:
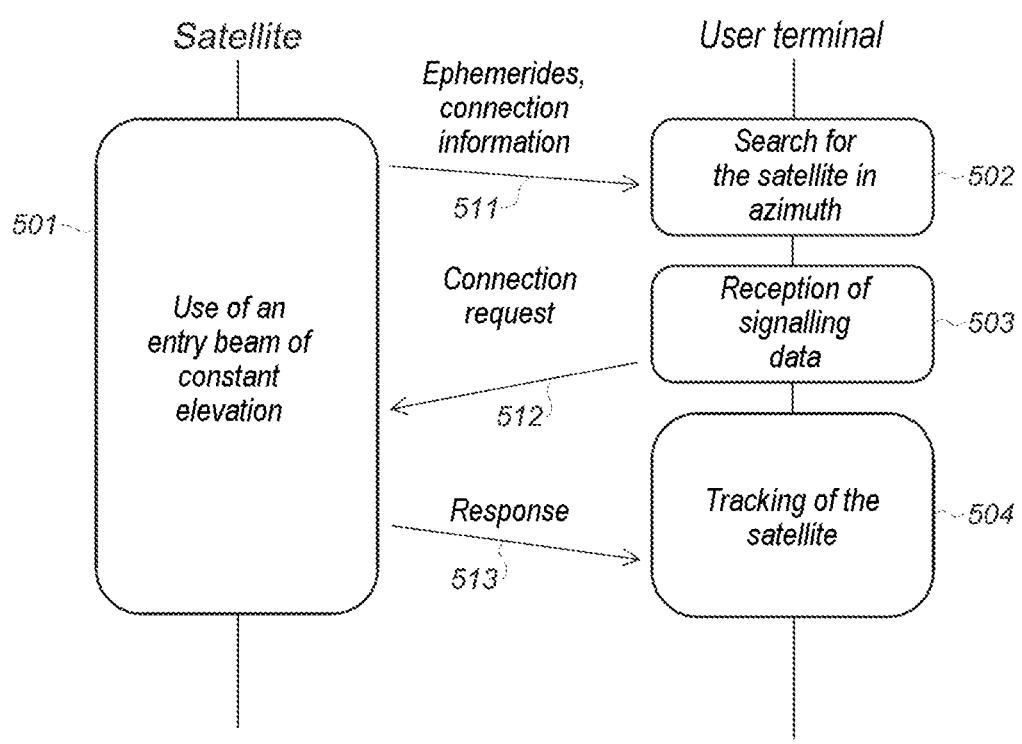
FIG. 5 is a chart showing the sequence of the exchanges between a satellite and a user terminal for entry of the user terminal into a network according to one embodiment of the invention.

FIG. 5 is a chart showing the sequence of the entry of a user terminal into a telecommunication network according to one embodiment of the invention, in the case of a non-geostationary satellite with an entry beam of constant elevation and of a user located in a region not covered by the satellite. This chart is one embodiment given merely by way of illustration.

The satellite forms antenna beams of constant elevation in resources of the hop frame that are dedicated to entry into the network, the entry beams being oriented in at least two different directions. Advantageously, the entry antenna beams are configured so as to cover all of an azimuth that is large but preferably substantially smaller than 180°, such as for example the sub-beams shown in FIG. 2B. The satellite uses these beams to transmit signalling information 511, such as for example ephemerides allowing the user terminal to determine its position and the position of the other satellites of the constellation, and information allowing the user terminal to transmit a connection request over the network, such as for example a frequency channel and/or time intervals in play.

For its part, the user terminal is configured to use an antenna with a directional antenna beam oriented with an elevation corresponding to the entry beams to detect 502 the satellite, and find the position of the satellite in azimuth alone.

Advantageously, when the satellite is configured to orient the entry beams so as to avoid user terminals transmitting in the direction of the geostationary arc, the user terminals may merely search for the satellite on an azimuth smaller than 180° in the direction opposite to the geostationary arc.

Advantageously, in order to accelerate the search for the satellite, the user terminal may use information stored in memory regarding the position of the satellite to decrease the in-azimuth search area. This information may for example be ephemerides allowing it to reconstruct the position of the satellite. In this case, the user terminal is capable of computing in a quite precise manner its azimuth, this allowing it to limit the search to around the expected position of the satellite. However, ephemerides have a very short duration of validity (a few hours). Advantageously, the invention proposes to use RAAN information (RAAN being the acronym of right ascension of the ascending node), giving the angle at which a satellite moving northwards crosses the equator. This information allows the orbit of the satellite to be determined, and the in-azimuth search range to be limited accordingly. The RAAN information has a much longer duration of validity than the ephemerides, of the order of several years. The search for the position of the satellite is then faster and less expensive in terms of processing operations, this allowing time to be freed up for the procedure for entry into the network itself.

Once the satellite has been detected, the user terminal collects signalling data transmitted by the satellite, and in particular ephemerides and information on connection modalities.

The ephemerides allow the user terminal to track the position of the satellite during its movements during the period of visibility, and therefore to remain in radio contact with the satellite even when the antenna of the user terminal is very directional. The information on connection modalities allows it to know the times and the frequency channels dedicated to the transmission of connection requests.

The user terminal is then able to make a connection request 512 to the satellite. The satellite transmits this request to a mission centre that records the presence of the user terminal, permits it or does not permit it to join the network, registers it and attributes thereto network parameters, such as for example an IP address. The satellite then sends a response 513 to the user terminal, information on the state of its registration in the network and its network parameters.

Once these steps have been carried out, the user terminal is registered in the satellite communication network, and the network manager in charge of definition of the beam-hop frames takes it into account during its subsequent assignments.

All of the exchanges shown in FIG. 5 may be carried out on a single resource of the hop frames that is dedicated to entry into the network, or on a plurality of dedicated resources during one or more passages in visibility of the satellite.

The operation of the method according to the invention for geostationary satellites differs in that the entry beam is not of constant elevation, and it is not essential to transmit information relative to the position of the satellite, or to carry out step 502 of searching for the satellite.

The method for entry into a telecommunication network according to the invention therefore comprises resources reserved in the beam-hop frames for entries/re-entries into the network, during which at least one satellite of the network is configured to have a directional antenna beam:

oriented so that, with the traffic beams, the entirety of the area of coverage of the satellite has a radio link with the satellite, or formed so that the entry beams are observable with a constant elevation from the Earth, for a network of non-geostationary satellites.

In the entry method according to the invention, the entry beams may be planned in parallel with traffic beams, and in the same frequency bands.

For non-geostationary satellites, the method according to the invention divides the entry beam into a plurality of beams of smaller angular aperture in azimuth transmitted on different resources of the hop frames in order to improve link budget. Advantageously, it is possible to orient the beam so that the user terminals do not emit in the direction of the geostationary arc.

The invention also relates to a satellite comprising means for forming antenna beams, and configured to form directional entry beams using dedicated resources of the hop frame, and to a satellite communication network comprising such a satellite. According to one embodiment, it is a question of a non-geostationary satellite configured to orient the entry beams so that they are seen from the Earth with a substantially constant elevation.

The invention also relates to a satellite user terminal, configured to search for the presence of a non-geostationary satellite by positioning its antenna with the given elevation of the entry beam, and by carrying out a scan of space in azimuth alone. This user terminal is configured to, once the satellite has been detected, collect connection information and transmit a request for entry/re-entry into the satellite communication network.

The invention claimed is:

1. A method for entry into a satellite communication network comprising at least one satellite, the communications of the satellite communication network being organized according to a beam-hopping mechanism wherein hop frames define antenna beam configurations of the at least one satellite, wherein resources of the hop frames are reserved for forming directional entry beams dedicated to entry or re-entry of user terminals into the satellite communication network, at least two of the directional entry beams having different directions of sight;
   wherein the directional entry beams are used for transmission, by the satellite, of information on the modalities of transmission of requests for entry or re-entry into the satellite communication network by user terminals, and for the transmission, by one or more user terminals, of requests for entry or re-entry into the satellite communication network.

2. The method for entry into a satellite communication network according to claim 1, wherein the amount and arrangement of the hop-frame resources reserved for forming directional entry beams is dynamically adaptable.

3. The method for entry into a satellite communication network according to claim 1, wherein the directional entry beams are configured so that the beams of the hop frames offer a radio link to all of the area of coverage of the satellite.

4. The method for entry into a satellite communication network according to claim 1, wherein the at least one satellite is a non-geostationary satellite, and wherein the directional entry beams are configured so as to be able to be seen from the Earth with a constant elevation.

5. The method for entry into a satellite communication network according to claim 4, wherein the elevation with which the directional entry beams may be seen from the Earth is comprised between 10° and 30°.

6. The method for entry into a satellite communication network according to claim 4, wherein the directional entry beams are configured so that a plurality of directional antenna beams covers an angular aperture smaller than 180°.

7. The method for entry into a satellite communication network according to claim 4, wherein the directional entry beams are oriented so that the emissions of user terminals entering or re-entering into the satellite communication network are not transmitted in the direction of the geostationary arc.

8. The method for entry into a satellite communication network according to claim 4, wherein a user terminal seeking to enter into the satellite communication network is configured to search for said at least one non-geostationary satellite by directing its antenna beam to an elevation corresponding to the elevation of the entry beam, and by carrying out a search for the satellite in azimuth alone.

9. The method for entry into a satellite communication network according to claim 8, wherein the user terminal uses information regarding the position of the satellite to decrease its in-azimuth search space.

10. The method for entry into a satellite communication network according to claim 4, wherein the elevation with which the directional entry beams are seen from the Earth is comprised between 15° and 25°.

11. The method for entry into a satellite communication network according to claim 4, wherein the elevation with which the directional entry beams are from the Earth is equal to 20°.

12. A satellite in a satellite communication network, communications of satellite in a satellite communication network are organized according to a beam-hopping mechanism wherein hop frames define antenna beam configurations of the satellite,
   wherein resources of the hop frames are reserved for forming directional entry beams dedicated to entry or re-entry of user terminals into the satellite communication network, at least two of the directional entry beams having different directions of sight; and
   wherein the directional entry beams are used for transmission, by the satellite, of information on the modalities of transmission of requests for entry or re-entry into the satellite communication network by user terminals, and for the transmission, by one or more user terminals, of requests for entry or re-entry into the satellite communication network.

13. A satellite communication network further comprising at least one satellite according to claim 12 and at least one user terminal.

14. A user terminal configured to enter or re-enter into a satellite communication network comprising at least one non-geostationary satellite, communications of the satellite communication network being organized according to a beam-hopping mechanism wherein hop frames define antenna beam configurations of the at least one non- geostationary satellite, resources of the hop frame being reserved for forming directional entry beams dedicated to entry or re-entry of user terminals into the satellite communication network, at least two of the directional entry beams having different directions of sight, the directional entry beams being configured so as to be able to the seen from the Earth with a constant elevation, the user terminal being configured to enter or re-enter into the satellite communication network by: orienting the elevation of its antenna beam to the elevation of the directional entry beam and by searching for the position of the satellite in azimuth alone, sending a request for entry or re-entry into the satellite communication network; and
   wherein the directional entry beams are used for transmission, by the satellite, of information on the modalities of transmission of requests for entry or re-entry into the satellite communication network by user terminals, and for the transmission, by one or more user terminals, of requests for entry or re-entry into the satellite communication network.

* * * * *